United States Patent [19]
Yamada et al.

[11] Patent Number: 5,676,882
[45] Date of Patent: Oct. 14, 1997

[54] FLUORESCENT SUBSTANCE AND MANUFACTURING METHOD THEREOF

[75] Inventors: Nobusuke Yamada, Tuchiura; Masahito Sano, Tsukuba, both of Japan

[73] Assignees: Toso Company, Ltd., Shinnanyo; Research Development Company of Japan, Kawaguchi, both of Japan; a part interest

[21] Appl. No.: 613,139

[22] Filed: Mar. 8, 1996

[30] Foreign Application Priority Data

Mar. 8, 1995 [JP] Japan ................................. 7-048225

[51] Int. Cl.$^6$ ................ C09K 11/59; C03B 35/14
[52] U.S. Cl. .................. 252/301.4 F; 501/12; 501/54; 423/335; 423/338; 423/339
[58] Field of Search .............. 252/301.4 F; 501/12, 501/54; 423/335, 338, 339

[56] References Cited

U.S. PATENT DOCUMENTS

| Re. 32,107 | 4/1986 | January | 501/12 |
| 3,999,835 | 12/1976 | Newns et al. | 501/54 |
| 5,229,336 | 7/1993 | Akiyama et al. | 501/54 |

*Primary Examiner*—Melissa Bonner
*Attorney, Agent, or Firm*—Sherman and Shalloway

[57] ABSTRACT

A fluorescent substance of which main component is comprised from 32 mol % to 35 mol % of silicon element and from 68 mol % to 65 mol % of oxygen element, and in which includes from 10 ppm to 1 wt % of silicon carbide and silicon nitride as an activator. And, a manufacturing method of the fluorescent substance by hydrolyzing silicon alkoxide by using alkali or acid catalyzer under the presence of carbon, and by heat treating the obtained precursor at the temperature of 500° C. to 900° C.

5 Claims, 3 Drawing Sheets

[Fig 1]
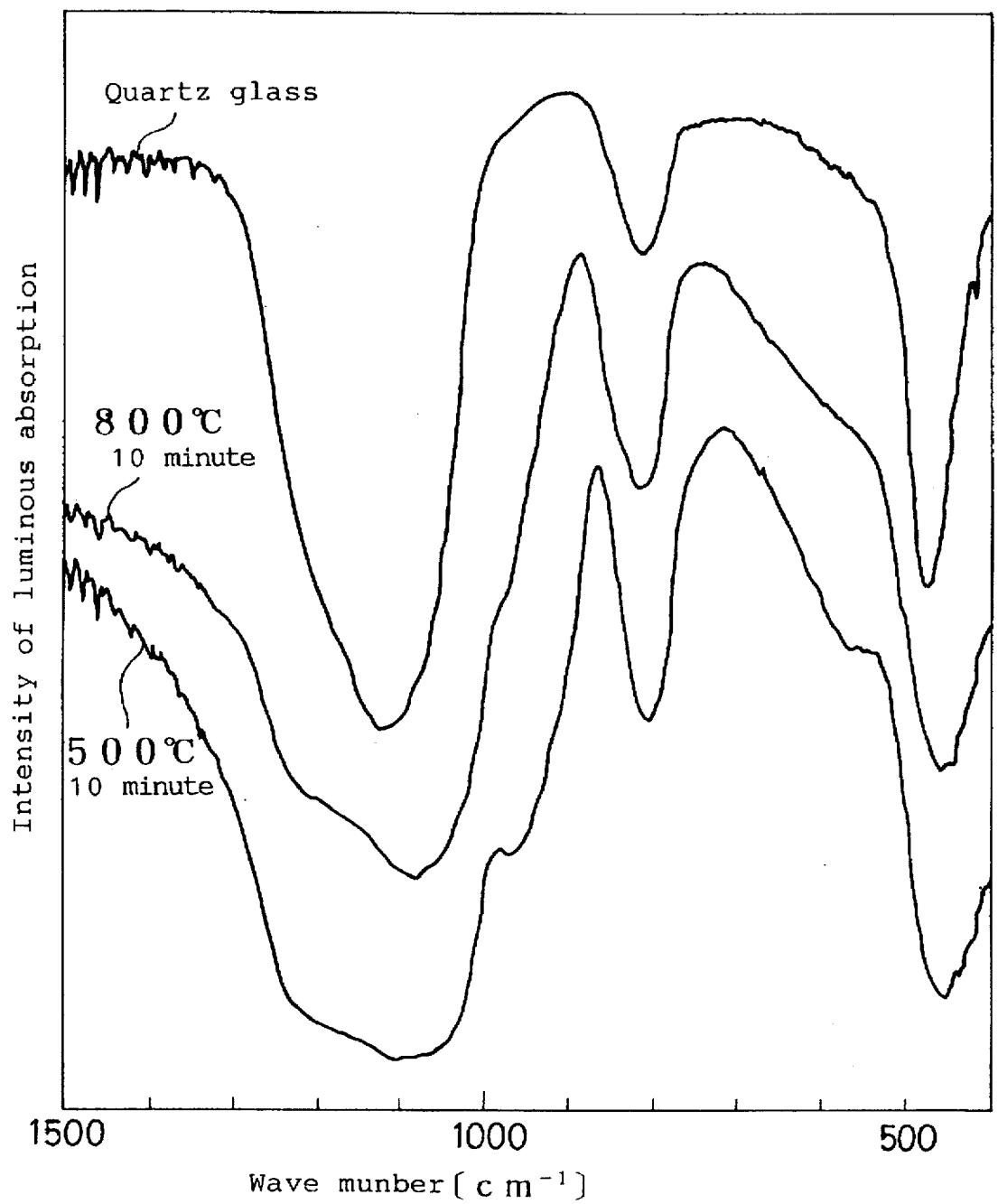

[Fig 2]
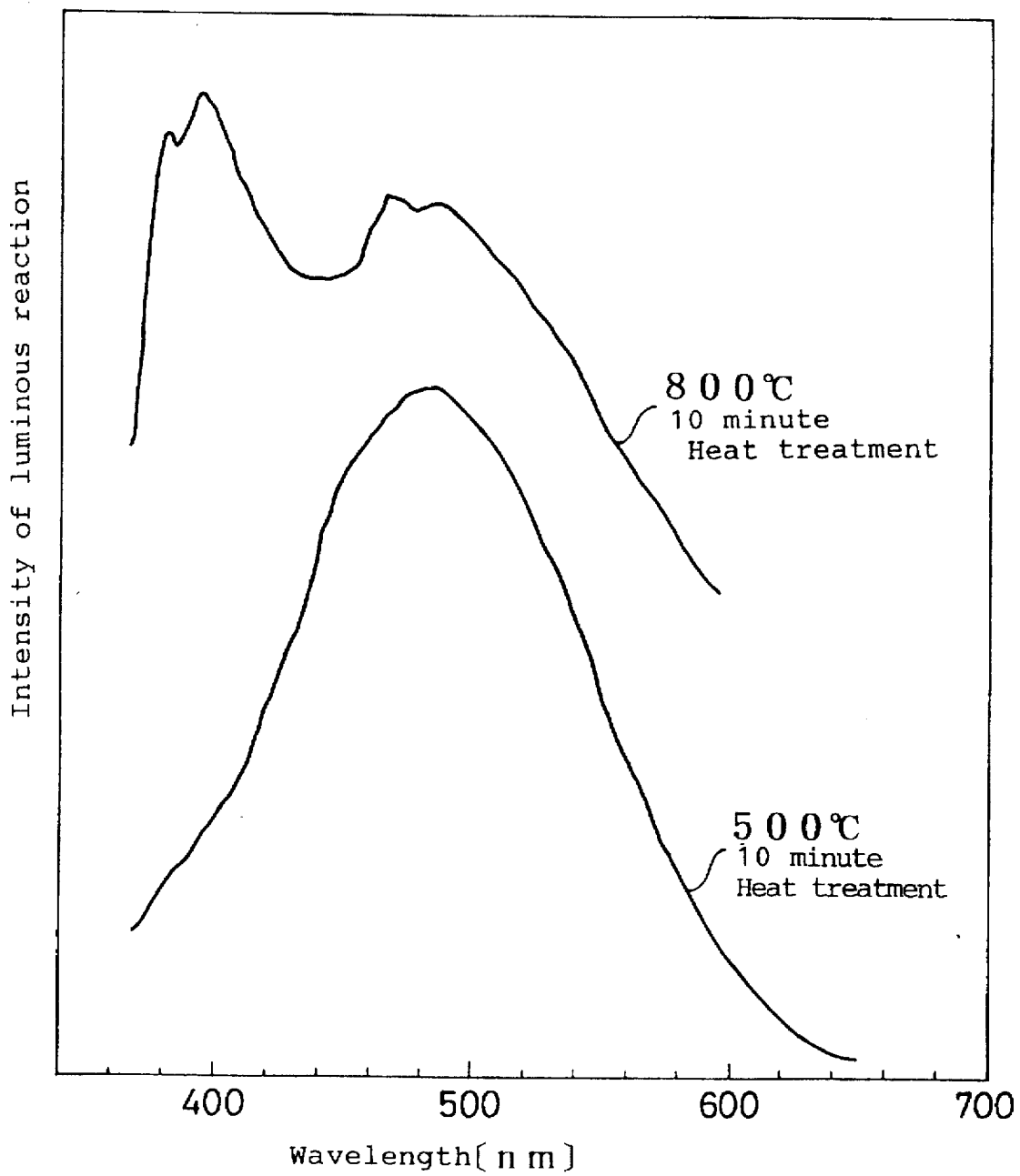

[Fig 3]
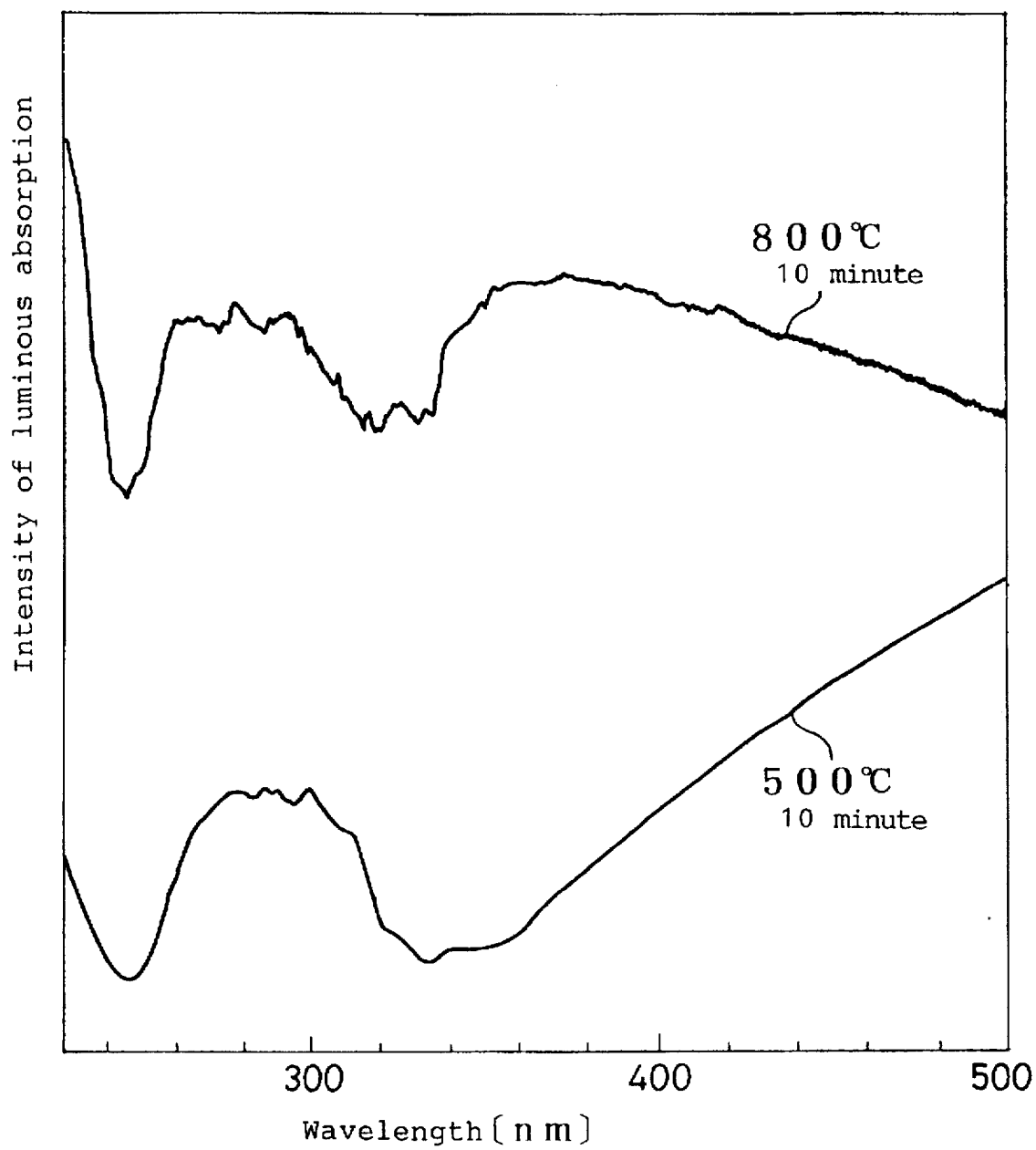

FLUORESCENT SUBSTANCE AND MANUFACTURING METHOD THEREOF

BACKGROUND OF THE INVENTION

This invention relates to a fluorescent substance of which main component is consisted of silicon and oxygen and a range of wave length of excitation ray that excite the fluorescent substance is from 320 nm to 360 nm. And further relates to a manufacturing method of the fluorescent substance.

DESCRIPTION OF THE PRIOR ART

A fluorescent substance is widely applied as a luminous substance of fluorescent lamp, display cathode-ray of TV and other various uses. This fluorescent substance is called as phosphorescence, and also is applied as a fluorescent paint of display plate used in darkroom and of watch face.

Heavy metal elements, particularly rare earth elements are used as raw materials of these fluorescent substances. Usually, chemical compounds of rare earth metals are dispersed in adequate dispersion medium and painted over the surface of objected place. Composition of fluorescent substance is invariable, and contamination by transition metals elements which are not mentioned in objective composition must be avoided. Noble metal elements, especially rare earth elements are usually used as a fluorescent substance, but these heavy metal elements are environmentally harmful, and the large amount of them can not be disposed unless by-products from manufacturing process are treated. Because separation and extraction of rare earth elements are technically hard, it is very difficult to produce a fluorescent substance by lower price.

As an excitation ray for an usual fluorescent substance, ultra violet ray having shorter wave length than 300 nm have been employed. However, because ultra violet ray having shorter wave length than 300 nm is harmful to human body, it is necessary to shelter it to prevent a leakage. And also, an ultra violet ray of which wave length is shorter than 200 nm have a tendency to be absorbed by air, it is necessary to take a complicated countermeasure such as to set up an exciting ray source closely to a fluorescent plate or to put all equipments in a vacuum system. Because a fluorescent substance which has longer fluorescent life time than microsecond or milli-second level has a longer after glow, it is difficult to distinguish an instant of changeover from exposed state to unexposed state. Accordingly, when it is applied as an indicating element, it causes problems such as blurring and fading of colour, and these problems place a limitation of application and usage of it.

Usually, a fluorescent substance has been manufactured in powder commodity shape. And before actual use, it must be solidified by various method fitted to each respective applications. Additional disadvantages caused by the solidification process are the falling down of fluorescent ability and the pollution to human body and to environment by contamination of impurities. Powder of fluorescent substance is manufactured in high temperature condition higher than 1000° C., and such process wastes a lot of energy.

SUMMARY OF THE INVENTION

Thus, a conventional fluorescent substance have a lot of problems caused not only by itself but also by manufacturing process of it. Thereupon, the inventors have conducted intensive studies to dissolve these problems, and have found out that a fluorescent substance of which main component is consisted of from 32 mol % to 35 mol % silicon element and of from 68 mol % to 65 mol % oxygen element and also in which includes silicon carbide and silicon nitride as an activator can dissolve these problems, and have accomplished this invention. A primary object of this invention is to provide a new fluorescent substance and a second object is to provide a manufacturing method of the new fluorescent substance.

BRIEF DESCRIPTION OF THE DRAWINGS

FIG. 1 IR spectrum of a fluorescent substance relates to this invention.

FIG. 2 Fluorescent analytical results of a fluorescent substance relates to this invention.

FIG. 3 Visible/UV spectrum of a fluorescent substance relates to this invention.

DETAILED DESCRIPTION OF THE INVENTION

A primary point of this invention comprises a fluorescent substance mainly consists of from 32 mol % and 38 mol % silicon element and of from 68 mol % to 65 mol % oxygen element, and in which includes from 10 ppm to 1 wt % silicon carbide and silicon nitride as an activator. And a second point comprises a manufacturing method of the fluorescent substance by heat setting a precursor which is obtained by hydrolysis reaction of silicon alkoxide with alkali or acid catalyst in the presence of carbon element at the temperature of 500° C. to 900° C.

That is, the fluorescent substance of this invention is consisted of silicon element and oxygen element, and is essentially $SiO_2$, including silicon carbide and silicon nitride as an activator. Conventional fluorescent substances are usually transitional metal elements, alkali earth elements and other heavy metal elements and includes rare earth elements as an activator. But the fluorescent substance of this invention does not essentially include rare earth elements. And unavoidable mixing content of them which is understood as impurity, is 1 ppm or less.

The fluorescent substance of this invention includes activator between 100 ppm and 1 wt % range. If the content of it, is smaller than 100 ppm the effect of it is not enough, and if the content excess 1 wt % the product become opaque so as not to accomplish the objects of this invention.

A manufacturing method of the fluorescent substance relating to this invention will become clear in the following detailed description.

Main compounds composed by silicon element and oxygen element is manufactured by hydrolysis reaction of silicon alkoxide by using alkali or acid catalyst. Tetra-metoxy-silane or tetra-ethoxy-silane is used as a silicon alkoxide, however it is to be understood that the invention is not intended to be limited to them.

Silicon carbide which acts as an activator in this invention is added by a method which adds organic additives to a starting materials. That is, the organic additives become graphite during a manufacturing process, and reacts with silicon element and performs silicon carbide. Silicon nitride which acts as an activator, is generated by a reaction of silicon with $N_2$ gas included in atomosphere in which raw materials of fluorescent substance is baked, or by some other origins caused on manufacturing process.

As organic additives, water or alcohol soluble compounds which generates graphite precursor by heating, are selected. As desirable organic additives, for example acenaphthylene or 2-methy-1,2 naphthyl-ketone sulfonate is mentioned, but this invention is not intended to be limited.

A manufacturing method of actual fluorescent substance is shown as below; silicon alkoxide is diluted by alcohol and then add more than two times water as much as silicon alkoxide by molar ratio. Organic additives to be added, is previously transformed to alcohol and water soluble state, then in advance is dissolved in alcohol. A method to make organic additives soluble in both alcohol and water is not limited to a special ones, however a method by sulfonation is recommendable. It is desirable to add to the solution a desiccate controlling agent which has higher boiling point and lower surface tension than water, e.g. N,N-dimethyl formamide. Especially, in a case of manufacturing big size shaped article, to add a desiccate controlling agent is more desirable. Then, alkali or acid catalyzer is added to the solution so as to advance a hydrolysis reaction and promote a transformation from silica sol state to silica gel state. After transformed to silica gel, alcohol and other solution are volatilized by controlling desiccating speed and consequently dry gel is obtained. Otherwise, after the hydrolysis reaction, obtained silica sol is coated over the surface of substrate by spin coating method so as to perform silica gel as thin film.

The dry silica gel or thin film silica gel obtained by above mentioned method, is heat treated in atmosphere of inert gas. Although there is no limitation regarding to increasing rate of temperature, desirably 20° C./hr or less is recommendable. The maximum heat treatment temperature must be higher than the baking temperature of dried silica gel to keep necessary tenacity and also must be lower than the dispersion temperature of added organic additives, and the temperature is desirably between 500° C. and 900° C., and more desirably between 600° C. and 800° C.

Results by infra red analysis of the obtained product are shown in FIG. 1. These results show that the obtained product has a same spectrum as to compound $SiO_2$ (quartz glass), therefore it become clear that the main component of this fluorescent substance is the compound of silicon/oxygen ½ in molar ratio. And quantity of carbon element and nitrogen element are determined by gas analysis, and it is recognized that the quantity of those two elements are bigger than 1 ppm but smaller than 1 wt %. The analytical result by micro atomic absorption shows that the concentration of rare earth elements, alkali metal elements and other heavy metal elements do not exceed 1 ppm.

The fluorescent substance is analyzed by fluorescent analyzer and a luminous reaction at the range from 320 nm to 400 nm and from 460 nm to 600 nm are observed against to a excitation ray from 320 nm to 400 nm. One example of fluorescent analytical result of a fluorescent substance to which 500 ppm of acenaphthylene is added, is shown in FIG. 2. In this case, the wave length of excitation ray is 337 nm.

Luminous absorption of the new fluorescent substance in the range from visible to ultra violet wave length is measured by visible/UV spectro chemical analyzer, and an absorption band between 320 nm and 360 nm is observed. By measuring an exciting spectrum against the luminous reaction at the range from 380 nm to 400 nm and from 460 nm to 600 nm which are detected by fluorescent spectrum analyzer, the peak absorption is observed at the range from 320 nm to 360 nm. FIG. 3 shows an example of analytical date of luminous absorption at visible/UV wave length of a specimen to which 500 ppm of acenaphthylene is added.

And the life time of fluorescent luminous of the range from 460 nm to 600 nm is 20 nano-second or less.

DETAILED DESCRIPTION OF EXAMPLE

This invention is further illustrated in the following examples, however it is to be understood that the invention is not intended to be limited to this example.

Example—1

76.11 gr of tetra-methoxy silane and 1.0 gr of methanol is poured into 300 ml beaker, then 15.02 gr of 0.1 wt % methanol solution of acenaphthylene is added as an organic activator. 36.55 gr of N,N'-dimethyl formamide is added as a desiccate controlling agent, and 88.25 gr of distillated water is added. This fluid is agitated for 2 hours by using teflon coated stirrer. And, 1.85 gr of 0.1N ammonia is added. After agitated again for a moment, the fluid is equally divided into six 120 ml cylindrical poly-propylene containers. The containers are sealed up by aluminum foil and are left for two days at room temperature so as to advance a hydrolysis reaction of tetra methoxy silane and to become a gel. After the gelation of contents is checked, these polypropylene containers are transferred into an incubator which is kept at 60° C. The contents are repened for 24 hours, and then three holes of 1–2 mm diameter are bored on aluminum foil cover to vaporize the solvent gradually and to desiccate the content. After kept them in the incubator of 60° C. for 20 days, the drying process is over and dried gel can be obtained.

The obtained gel is transferred into an electric furnace. After the atomosphere of furnace is replaced by nitrogen gas, temperature of the furnace is gradually raised under small flow rate of nitrogen gas. Rising rate of furnace temperature is 20° C./hour. When the furnace temperature become 700° C. heating is stopped and kept at 700° C. for 10 minutes, then cooled down to the room temperature by 150° C./hour cooling rate. And the fluorescent product is picked up from the furnace.

According to analytical results by infra red spectrum analysis, it is clear that the main component of obtained fluorescent substance is $SiO_2$. And by micro emission spectrochemical analysis, silicon, oxygen, carbon, nitrogen and a trace of calcium are detected and any other elements can not be detected. By a visible/UV spectrum analysis, an absorption is observed at range of wave length from 320 nm to 360 nm. By using a spectro photo fluoro meter, a fluorescence having a peak at 500 nm against 337 nm excitation ray is observed. And it is proved that the wave length of excitation ray which excites a fluorescence having a peak at 500 nm is due to and absorption of range from 320 nm to 360 nm which is detected by a visible/UV spectrometer.

And the life time of fluorescence having a peak at 500 nm around is 10 nano-second or less.

As aforesaid, the new fluorescent substance relating to this invention is radiated by an excitation ray in the range of from 320 nm to 360 nm wave length, and compared to the wave length of an excitation ray of conventional fluorescent substance it is considerably long. Consequently, this product is harmless to human body. And, because the fluorescent life time of the product is shorter than 20 nano-second, it has an effect to reduce a blurring and fading of image when it is applied as an indicating element of TV tube or CRT display.

Furthermore, because the fluorescent substance relating to this invention is mainly composed by silicon and oxygen, and a heavy metal elements especially rare earth elements are not necessary to be used in its manufacturing process, it does not have a problem to contaminate nature environment.

In the manufacturing process, the products are treated in sol or gel state and is not processed in powder state, it can omit a troublesome powder treatment process. Therefore, by this invention a harmless and cheap fluorescent substance can be easily obtained.

While the preferred form of the present invention has been described, it is to be understood that modifications will be apparent to those skilled in the art without departing from the spirit of the invention.

The scope of the invention, therefore, is to be determined solely by the following claims.

What is claim is:

1. A fluorescent substance of which the main component is composed of from 32 mol % to 35 mol % of silicon element comprising $SiO_2$, silicon nitride and silicon carbide and from 68 mol % to 65 mol % of oxygen element and in which silicon carbide and silicon nitride are present in an amount of from 10 ppm to 1 wt %.

2. A fluorescent substance of claim 1, wherein the contents of rare earth elements, transition metal elements, alkali metal elements, alkaline earth elements and other heavy metal elements is 1 ppm or less.

3. A fluorescent substance of claim 1, which is made luminous by excitation ray of from 320 nm to 360 nm wave length.

4. A fluorescent substance of claim 1, of which fluorescent life time is 20 nano-second or less.

5. A manufacturing method of the fluorescent substance of claim 1, characterized by hydrolyzing a silicon alkoxide by using alkali or acid catalyzer in the presence of organic additives containing carbon element, and by heat treating the obtained precursor in a nitrogen containing inert atmosphere at a temperature of from 500° C. to 900° C. whereby the silicon carbide and silicon nitride are formed.

* * * * *